US012781141B2

(12) United States Patent
Malatak

(10) Patent No.: US 12,781,141 B2
(45) Date of Patent: Nov. 3, 2026

(54) FLUID CATALYTIC CRACKING OF RENEWABLE FEEDSTOCKS

(71) Applicant: Valero Services, Inc., San Antonio, TX (US)

(72) Inventor: William A. Malatak, San Antonio, TX (US)

(73) Assignee: Valero Services, Inc., San Antonio, TX (US)

( * ) Notice: Subject to any disclaimer, the term of this patent is extended or adjusted under 35 U.S.C. 154(b) by 0 days.

(21) Appl. No.: 19/550,194

(22) Filed: Feb. 25, 2026

(65) Prior Publication Data

US 2026/0250583 A1 Aug. 27, 2026

Related U.S. Application Data

(60) Provisional application No. 63/763,776, filed on Feb. 26, 2025.

(51) Int. Cl.
*C10G 55/06* (2006.01)
*B01D 3/00* (2006.01)
(Continued)

(52) U.S. Cl.
CPC ............ *C10G 55/06* (2013.01); *B01D 3/007* (2013.01); *B01D 3/14* (2013.01); *B01J 8/1836* (2013.01);
(Continued)

(58) Field of Classification Search
CPC .... C10G 55/06; C10G 11/182; C10G 11/185; C10G 67/02; C10G 2300/1007;
(Continued)

(56) References Cited

U.S. PATENT DOCUMENTS 12,037,548 B2 * 7/2024 Larsen .................... C10G 3/57
12,582,954 B1 * 3/2026 Hommeltoft ............. B01J 8/26
(Continued)

FOREIGN PATENT DOCUMENTS

WO WO-2012091815 A1 * 7/2012 ............... C10G 3/42
WO WO-2017004355 A1 * 1/2017 ............ C10G 47/02

OTHER PUBLICATIONS

International Search Report and Written Opinion on PCT/US2026/016713 dated Jun. 24, 2026, 16 pgs.

*Primary Examiner* — Tam M Nguyen
(74) *Attorney, Agent, or Firm* — Foley & Lardner LLP

(57) ABSTRACT

The present disclosure relates generally to the field of renewable fuel production. More particularly, the disclosure is directed to systems and methods for processing renewable feedstocks in a fluidized catalytic cracking (FCC) process unit to produce renewable gasoline, gasoline blendstocks, and/or other hydrocarbon products. The disclosure includes modifications to the point of introduction of the renewable feed into the FCC unit and adjustments to one or more operating conditions to accommodate feedstocks that differ substantially in composition and properties from conventional petroleum derived feeds. A renewable feedstock is optionally pretreated and/or hydroprocessed, then introduced into a fractionator associated with the FCC unit, where it is preheated by indirect or direct contact with an FCC reactor product stream. Such modifications enable efficient operation and conversion of renewable feed materials while maintaining desired product yields, catalyst performance, and unit operability.

13 Claims, 4 Drawing Sheets

(51) Int. Cl.

| | |
|---|---|
| ***B01D 3/14*** | (2006.01) |
| ***B01J 8/18*** | (2006.01) |
| ***B01J 8/20*** | (2006.01) |
| ***B01J 8/26*** | (2006.01) |
| ***C10G 11/18*** | (2006.01) |
| ***C10G 55/00*** | (2006.01) |
| ***C10G 55/02*** | (2006.01) |
| ***C10G 67/02*** | (2006.01) |
| *B01D 53/02* | (2006.01) |
| *B01D 53/14* | (2006.01) |

(52) U.S. Cl.

CPC . *B01J 8/20* (2013.01); *B01J 8/26* (2013.01); *C10G 11/182* (2013.01); *C10G 11/185* (2013.01); *C10G 67/02* (2013.01); *B01D 53/02* (2013.01); *B01D 53/14* (2013.01); *B01D 2257/504* (2013.01); *B01J 2208/00176* (2013.01); *B01J 2208/00504* (2013.01); *C10G 2300/1007* (2013.01); *C10G 2300/1014* (2013.01); *C10G 2300/1018* (2013.01); *C10G 2300/1074* (2013.01); *C10G 2300/301* (2013.01); *C10G 2300/70* (2013.01); *C10G 2400/02* (2013.01)

(58) Field of Classification Search

CPC .... C10G 2300/1014; C10G 2300/1018; C10G 2300/1074; C10G 2300/301; C10G 2300/70; C10G 2400/02; B01D 3/007; B01D 3/14; B01D 53/02; B01D 53/14; B01D 2257/504; B01J 8/1836; B01J 8/20; B01J 8/26; B01J 2208/00176; B01J 2208/00504

See application file for complete search history.

(56) References Cited

U.S. PATENT DOCUMENTS

| | | | | |
|---|---|---|---|---|
| 2008/0035527 | A1* | 2/2008 | Eng | C10G 11/182 208/113 |
| 2009/0127161 | A1 | 5/2009 | Haizmann et al. | |
| 2012/0289752 | A1 | 11/2012 | Gosselink et al. | |
| 2022/0145188 | A1 | 5/2022 | Kim et al. | |
| 2022/0213389 | A1* | 7/2022 | Kouris | C10G 11/18 |
| 2022/0333023 | A1* | 10/2022 | Kadlecek | C10G 65/00 |
| 2023/0183586 | A1* | 6/2023 | Xu | C10G 1/06 585/240 |
| 2023/0399571 | A1* | 12/2023 | Menegassi De Almeida | C07C 29/1516 |
| 2024/0067885 | A1* | 2/2024 | Xu | C10G 11/05 |
| 2024/0327723 | A1* | 10/2024 | Larsen | C07C 4/06 |
| 2024/0360366 | A1 | 10/2024 | Schneider et al. | |

* cited by examiner

FLUID CATALYTIC CRACKING OF RENEWABLE FEEDSTOCKS

PRIORITY CLAIM

This application claims the benefit of and priority to U.S. Provisional Patent Application No. 63/763,776, filed on Feb. 26, 2025, the entire contents of which is hereby incorporated by reference.

FIELD OF INVENTION

The present disclosure relates generally to the field of renewable fuel production, specifically the use of fluidized catalytic cracking to generate renewable gasoline and/or blending agents.

BACKGROUND

Petroleum-derived hydrocarbon fuels such as diesel, kerosene, jet fuel, and gasoline, are widely used for transportation purposes. There is growing interest in processing renewable and biogenic feedstocks, such as plant oils, plant fat, animal oils, animal fats, waste fats, used cooking oils, lipids, and other renewable streams, to generate hydrocarbon fuels having combustion, handling, and specification properties comparable to conventional petroleum-derived transportation fuels. However, the precise chemical composition of renewable feedstocks can vary from similar petroleum-derived feedstocks. Thus, production of fuels and other products from renewable sources will require new refining pathways and operating conditions compared to conventional refining pathways and operating conditions associated with petroleum-derived feedstocks.

SUMMARY OF THE INVENTION

The present disclosure relates to methods and systems for producing renewable fuel products using a fluidized catalytic cracking (FCC) unit in combination with one or more fractionation columns. In certain embodiments, a renewable feedstock, such as a plant-derived oil or fat or an animal-derived oil or fat, is introduced into a fractionator. As the renewable feedstock passes through the fractionator, it is preheated and may optionally be further heated before entering a reactor section of an FCC unit. The renewable feedstock passing through the fractionator assists with sweeping catalyst from the fractionator. Within the reactor section, such as in the reactor or the riser or both, at least a portion of the preheated renewable feedstock is contacted with FCC catalyst under cracking conditions to produce a first product stream containing one or more renewable fuel products. The FCC reactor products are introduced to the fractionator, where they participate in preheating the renewable feedstock material.

The renewable feedstock and/or separately injected streams may include petroleum-derived coke precursor material (e.g., slurry oil, coker gas oil, and petroleum residue, or a combination thereof) introduced into the reactor or reactor bed to increase coke make and manage the FCC heat balance. FCC catalyst is separated from the product stream and regenerated with oxygen in a regenerator, and hot regenerator flue gas can be used to power a turboexpander, drive a blower, preheat regenerator air, and optionally be prepared for $CO_2$ capture and sequestration. Operating conditions include, for example, a fractionator bottoms temperature of about 520-720° F. and renewable liquid boiling ranges of about 250-1150° F.

In some embodiments, at least a portion of the first product is routed to a fractionation column for separation into two or more product fractions. The fractionation column may be directly associated with the FCC unit or may be a separate, downstream fractionator. The fractionators can be configured to handle feeds having boiling ranges in the approximate range of 300° F. to 1100° F., and may be arranged so that one or more of the separated streams are recycled, blended, or sent to additional processing units. The renewable feedstock can optionally be co-fed with non-renewable fuels and may optionally contain petroleum-derived coke precursors, catalyst fines carried from the fractionation system, or both.

The FCC unit may include a reaction section, comprising a riser and reactor (and optionally a reactor stripper), and a regenerator section. In certain embodiments, catalyst is separated from the first product stream using a catalyst separation system comprising one or more baffles and one or more cyclones. Spent catalyst is transferred to a regenerator, where it is contacted with an oxygen-containing stream to burn off coke and regenerate the catalyst. Hot waste gas from the regenerator can be directed to one or more waste heat boilers to generate steam and to one or more expanders to provide electrical power and/or compression duty to an air or oxygen feed system supplying the regenerator.

In certain embodiments, a fresh feed stream is introduced into a lower section of a fractionator that receives hot reactor effluent from a fluidized catalytic cracking (FCC) reactor. The fresh feed is brought into direct contact with ascending hot, lower-boiling reactor products within the fractionation zone, thereby effecting simultaneous heat transfer and partial fractionation through direct vapor-liquid contact. Due to its relatively higher boiling range, the fresh feed descends within the fractionator while lighter converted products rise and are withdrawn at selected draw points located in upper sections of the column. The heated fresh feed collects in the bottom section of the fractionator and is withdrawn and pumped to the inlet of the FCC reactor, where it is catalytically converted to produce a hot effluent stream comprising lighter hydrocarbon reactor product that is subsequently returned to the fractionator for separation and recovery.

This configuration differs from conventional petroleum-derived FCC unit operation, in which fresh feed is typically preheated indirectly through heat exchange with fractionator intermediate and/or product streams prior to being routed optionally to a fired heater and then directly to the reactor, without introduction into the main fractionation column. In contrast, the present disclosure employs direct introduction of the fresh feed into the fractionator to achieve integrated and direct contact heat recovery, and provides a volume of liquid flow sufficient to maintain bottoms liquid flow and to capture and recycle entrained catalyst carried over from the reactor. The conversion of renewable material in the FCC process is much higher than petroleum feeds and the reactor product contain very little high boiling material. This results in very little bottoms liquids and the drying up of the column bottoms. Such integration provides an operational scheme not utilized in traditional FCC processing of petroleum derived feeds and is particularly advantageous for feeds capable of achieving very high conversion rates.

In a first aspect, which may be combined with any other aspect or embodiment disclosed herein, a method of producing a renewable fuel product, the method including: optionally pretreating a renewable feedstock; optionally hydroprocessing the renewable feedstock; providing the renewable feedstock into one or more injection ports of a fractionator, thereby preheating the renewable feedstock with an FCC reactor product stream; optionally further heating the preheated renewable feedstock; and feeding the preheated renewable feedstock into a reactor section of a fluidized catalytic cracker such that at least a portion of the preheated renewable feedstock is contacted with an FCC catalyst, thereby producing the FCC reactor product stream; wherein the renewable feedstock comprises one or more of a plant-derived oil, a plant-derived fat, an animal-derived oils, an animal-derived fat, free fatty acids, and algal oils.

In some embodiments, the method includes feeding at least a portion of the FCC reactor product to at least one of the fractionator or a second fractionator; and fractionating the first product into two or more fraction products comprising light gases, liquified petroleum gas, light cat naphtha, heavy cat naphtha, light cat gasoline, heavy cat gasoline, kerosene, diesel, cycle oil, and slurry. In some embodiments, the fractionator has a fractionator bottoms temperature between 520° F. and 720° F. In some embodiments, a portion of one or more of the two or more fraction products recovered from the fractionator are returned to the reactor section for further conversion. In some embodiments, one or more of a diesel product fraction, a cycle oil fraction, and a slurry fraction are recycled to extinction.

In some embodiments, the FCC reactor product is fed to the fractionator, and the fractionator is associated with the fluidized catalytic cracker. In some embodiments, preheating the renewable feedstock is performed via direct contact of at least a portion of the renewable feedstock with at least a portion of the FCC reactor product stream in the fractionator. In some embodiments, the preheated renewable feedstock comprises catalyst fines captured from the fractionator, the catalyst fines comprising FCC catalyst captured.

In some embodiments, at least a portion of the renewable feedstock is preheated by the FCC reactor product stream indirectly in a heat exchanger.

In some embodiments, the method also includes heating at least a portion of the renewable feedstock in a fired heater.

In some embodiments, the preheated renewable feedstock has a temperature of about 300° F. to about 900° F. when fed to the reactor section.

In some embodiments, the reactor section of the fluidized catalytic cracker comprises a riser and a reactor, and the renewable feedstock is injected into one or more of the riser and the reactor.

In some embodiments, a liquid portion of the renewable feedstock has a boiling point of about 250° F. to about 1150° F.

In some embodiments, the renewable feedstock further comprises petroleum-derived coke precursor material. In some embodiments, the petroleum-derived coke precursor material comprises slurry oil, coker gas oil, and petroleum residue, or a combination thereof.

In some embodiments, the method also includes injecting a petroleum-derived coke precursor material into the reactor section of the FCC. In some embodiments, at least a portion of the petroleum-derived coke precursor material is injected into the reactor or reactor bed of the reactor section. In some embodiments, the petroleum-derived coke precursor material comprises slurry oil, coker gas oil, and petroleum residue, or a combination thereof.

In some embodiments, the method also includes: separating at least a portion of the FCC catalyst from the FCC reactor product stream; providing the separated FCC catalyst to a regenerator wherein the FCC catalyst is contacted with oxygen; and regenerating the FCC catalyst in the regenerator. In some embodiments, at least a portion of a hot waste gas produced by the regeneration of the FCC catalyst is used to: provide energy to a turboexpander to produce electric or shaft power to drive a blower for a regenerator air feed, preheat the regenerator air feed, or any combination thereof. In some embodiments, at least a portion of a regenerator flue gas is prepared for carbon capture and sequestration. In some embodiments, the renewable feedstock comprises a mixture of renewable material and petroleum-derived material.

In another aspect, which may be combined with any other aspect or embodiment disclosed herein, a system for producing a renewable fuel product includes: a fractionation column configured to receive a flow of feedstock into one or more injection ports and to preheat the flow of feedstock, the feedstock comprising a renewable fuel; and a fluidized catalytic cracker having a reactor section and a regenerator section, the reactor section comprising a riser and a reactor, the reactor section configured to receive a flow of the preheated feedstock, the riser configured to receive a flow of regenerated catalyst from the regenerator section and to direct the regenerated catalyst to the reactor, wherein the flow of the preheated feedstock is contacted with the regenerated catalyst within the reactor section, thereby converting at least a portion of the preheated feedstock into a first product stream and converting at least a portion of the regenerated catalyst to spent catalyst.

In some embodiments, the fractionation column is configured to receive a flow of the first product from the reactor section of the fluidized catalytic cracker and to fractionate the first product stream into two or more fraction streams, the fraction streams comprising light gases, liquified petroleum gas, light cat naphtha, heavy cat naphtha, light cat gasoline, heavy cat gasoline, kerosene, diesel, cycle oil, and slurry. In some embodiments, the system is configured to recycle at least a portion of one or more of a diesel fraction, a cycle oil fraction, and a slurry fraction to the reactor section of the fluidized catalytic cracker.

In some embodiments, the fractionator is a first fractionator and further comprising a second fractionator configured to receive at least a portion of the first product and fractionate the first product stream into two or more fraction streams.

In some embodiments, the preheated feedstock comprises one or more of a plant-derived oil, a plant-derived fat, an animal-derived oils, an animal-derived fat, free fatty acids, and algal oil.

In some embodiments, the preheated feedstock further comprises a petroleum-derived coke precursor material. In some embodiments, the petroleum-derived coke precursor material comprises slurry oil, coker gas oil, and petroleum residue, or a combination thereof.

In some embodiments, the system also includes one or more injectors configured to receive a flow of a petroleum-derived coke precursor feedstock comprising a petroleum-derived coke precursor material and to inject the petroleum-derived coke precursor feedstock into the reactor section of the fluidized catalytic cracker. In some embodiments, the petroleum-derived coke precursor material comprises slurry oil, coker gas oil, and petroleum residue, or a combination thereof.

In some embodiments, the system also includes: a catalyst separation system comprising one or more baffles and one or more cyclones, the catalyst separation system configured to remove spent catalyst from the first product stream, the catalyst separation system configured to direct spent catalyst to the regenerator section; and a combustion air system configured to provide oxygen to the regenerator section. In some embodiments, the system further includes one or more of an expander configured to provide electrical power or compression duty to a compressor associated with the combustion air system. In some embodiments, the system further includes a carbon capture system configured to capture at least a portion of $CO_2$ produced by the regenerator section, the carbon capture system comprising one or more of an amine-based absorption system, physical solvent system, adsorption unit, membrane separation system, and a cryogenic separation system.

In an aspect, which may be combined with any other aspect or embodiment herein, a method of producing a renewable fuel product includes: optionally pretreating a renewable feedstock; optionally hydroprocessing the pretreated renewable feedstock; preheating at least a portion of the renewable feedstock via direct or indirect contact with an FCC reactor product stream from a fluidized catalytic cracker; optionally further heating the preheated renewable feedstock; feeding the preheated renewable feedstock into a reactor section of the fluidized catalytic cracker such that at least a portion of the preheated renewable feedstock is contacted with an FCC catalyst, thereby producing the FCC reactor product stream; feeding a petroleum-derived coke precursor material into the reactor section; and feeding the FCC reactor product stream to a fractionator to preheat the at least a portion of the renewable feedstock and to fractionate the FCC reactor product stream into two or more fraction product streams, wherein the renewable feedstock comprises one or more of a plant-derived oil, a plant-derived fat, an animal-derived oils, an animal-derived fat, free fatty acids, and algal oils, wherein hydroprocessing the pretreated feedstock includes one or more of hydrotreating, hydrocracking, hydrodeoxygenation, hydrodenitrification, hydrodesulfurization, isomerization, and hydroisomerization.

In some embodiments, the petroleum-derived coke precursor material is co-fed to the reactor section with the renewable feedstock. In some embodiments, the petroleum-derived coke precursor material comprises slurry oil, coker gas oil, and petroleum residue, or a combination thereof.

This summary is provided to introduce a selection of concepts in a simplified form and is not intended to identify key or essential features of any embodiment, nor is it intended to be used to limit the scope of the claimed subject matter. The subject matter disclosed herein may be embodied in many different forms and should not be construed as limited to the embodiments set forth in this summary. The scope of the claimed subject matter is defined solely by the claims as filed and as may be amended, and all embodiments and aspects described herein, including in this summary, may be combined or omitted in whole or in part unless expressly stated otherwise.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Renewable Feedstock Pathways

Figure 1:
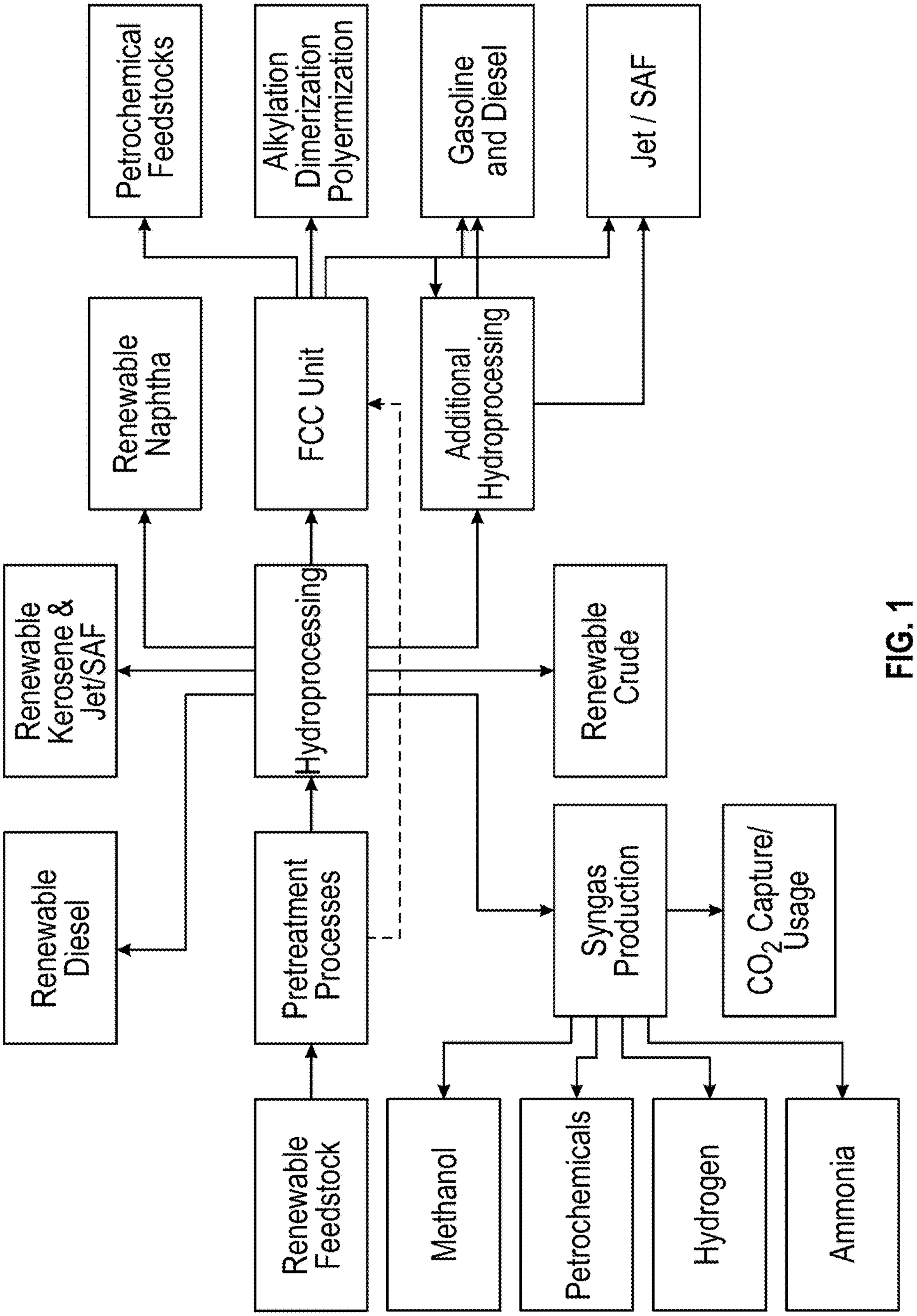
FIG. 1 is process flowchart showing potential chemical pathways for a renewable feedstock, according to some embodiments.

With reference to FIG. 1, renewable feedstocks, such as plant-based oils and fats and animal-based oils and fats (e.g., fats, oils, triglycerides, and free fatty acids), may be utilized to produce a variety of renewable fuels and intermediate feedstocks suitable for further processing. However, as-received renewable feedstocks typically contain a range of contaminants and reactive species including metals (e.g., Na, K, Ca, Mg), phosphorus-containing compounds (e.g., phospholipids), chlorides, soaps, organic acids, and suspended solids that can adversely affect catalyst performance, promote corrosion or fouling, and upset unit heat and material balances in other refining systems. Accordingly, pretreatment of the renewable feedstock is often desirable, and in some cases necessary, to make the feedstock compatible with, for example, FCC operation and to protect downstream equipment and catalysts.

In certain embodiments, a raw renewable feedstock is subjected to a physical, thermal, hydrothermal, or chemical pretreatment step prior to introduction into downstream processes. Physical pretreatment may include filtering, solids removal, flocculation, phase separation, centrifugation, or other processes that remove contaminants from the renewable feedstock. Thermal pretreatment may include heating under controlled residence time and atmosphere (e.g., inert or reducing conditions) to remove water, reduce viscosity, and promote the breakdown of gums or other high-molecular-weight species. Hydrothermal pretreatment may involve contacting the renewable feedstock with steam or liquid water at elevated temperature and pressure to hydrolyze triglycerides or phospholipids present in the renewable feedstock, to promote phase separation of hydrophilic impurities, and to facilitate subsequent removal of aqueous-phase contaminants. Chemical pretreatment can comprise neutralization of free fatty acids with a base to form soaps that can be separated, demetallization via chelation or precipitation, or treatment with acids to decompose soaps and remove metal contaminants in a separable phase.

Additional pretreatment may include contacting the feedstock with activated clays, adsorbents, or ion exchange materials to remove polar and mineral- and/or metal-containing impurities. For example, bleaching earths or activated clays can be used to adsorb phospholipids, soaps, trace metals, peroxides, and color bodies. Granular or powdered adsorbents, including silica-based or alumina-based materials, may be employed to remove organic acids, sulfur- and nitrogen-containing compounds, and other polar species. Ion exchange resins or membranes, including cationic and anionic materials, can be used to reduce alkali and alkaline-earth metal concentrations, remove chloride ions, and mitigate the risk of catalyst poisoning, regenerator afterburn, and high-temperature corrosion in downstream processing equipment. In some embodiments, one or more of these pretreatment techniques are used in combination, in series or in parallel, to achieve the desired impurity profile and stability of the renewable feedstock.

After pretreatment, the renewable feedstock may be subjected to one or more hydroprocessing steps to saturate double bonds present in the feedstock, to remove heteroatoms such as oxygen, sulfur, and halogens, and/or to isomerize the hydrocarbons. In certain embodiments, the feedstock is contacted with one or more of a hydrotreating, hydrodeoxygenation, or hydrocracking catalyst in the presence of hydrogen under elevated temperature and pressure. The hydroprocessing serves to saturate olefinic and diolefinic (and polyunsaturated/polyolefinic) species and, where present, to hydrogenate aromatic compounds. Hydroprocessing also removes organically bound oxygen, sulfur, nitrogen, and halogens, thereby reducing the heteroatom content of the product stream. These steps improve the stability, storage properties, and reaction characteristics of the renewable feedstock and make it more compatible with conventional refinery units and fuel specifications. Optional isomerization steps may be employed downstream or integrated with hydroprocessing steps to rearrange straight-chain paraffins into branched paraffins. Such isomerization can significantly improve the low-temperature operability of the resulting product by lowering its freeze point, cloud point, and pour point, which is particularly beneficial for diesel and jet/SAF applications.

The hydroprocessed feedstock may then be fractionated to produce one or more renewable fuel product streams and heavier streams requiring further processing. The fractionator may be operated such that the bottoms temperature is in the range of about 400° F. to about 800° F., about 500° F. to about 750° F., or about 520° F. to about 720° F., or any desired range as appropriate to collect the desired cuts. In certain embodiments, depending on the composition of the feedstock, lighter portions of the hydroprocessed feedstock are separated into fractions suitable for use as renewable diesel, renewable kerosene, renewable jet fuel (sustainable aviation fuel, SAF), renewable propane, and/or renewable naphtha, depending on boiling range and product specifications. In other embodiments, all or a portion of the hydroprocessed stream is used as a renewable crude feedstock for general refinery operations, thereby reducing the overall carbon intensity of the refinery products. The hydroprocessed renewable material can also be routed to units designed for synthesis gas (syngas) production, such as steam reformers, prereformers, autothermal reformers, or partial oxidation units, to generate renewable syngas that may be further processed to produce renewable methanol, petrochemicals, or commodity chemicals, and/or hydrogen. In addition, the renewable feedstock can be processed in hydroprocessing and/or hydrotreating units to produce gasoline, diesel, and jet fuel/SAF that incorporate a renewable content. Co-processing of the renewable feedstock with conventional petroleum-derived materials is also possible.

Another option is to utilize the renewable feedstock as feed for a fluidized catalytic cracker (FCC). Such a process may be particularly suitable for heavier feedstocks, including materials whose boiling range and viscosity are comparable to kerosene, diesel oil, atmospheric gas oils, or vacuum gas oils. In conventional operation, fluidized catalytic cracking is used by refiners to increase the production of gasoline and other valuable liquid products from crude-oil-derived or other petroleum-derived feedstocks. An FCC unit converts heavy, low-value fractions of crude oil into lighter, high-value products such as gasoline, propylene, butenes, liquefied petroleum gas (LPG), and components in the diesel and jet/SAF distillation ranges. Typical FCC feedstocks include atmospheric gas oils, vacuum gas oils, and other heavy streams that cannot be economically upgraded by simple distillation alone.

The transition to renewable feedstocks can create significant operational challenges for refineries that are configured and heat-balanced for conventional petroleum-derived FCC feedstocks. Renewable hydrocarbon feeds, such as plant- or animal-derived oils and fats, are typically mostly paraffinic C16+ hydrocarbons, and thus generally contain less carbon, metals, and other coke-forming precursors than typical vacuum gas oil or resid-based FCC feeds. Consequently, when these renewable feeds are cracked, pilot testing has shown that less coke is deposited on the circulating FCC catalyst. Because the heat required to drive the endothermic cracking reactions is primarily supplied by burning this coke in the catalyst regenerator, reduced coke formation leads directly to reduced heat release in the regeneration step.

In conventional FCC operation, the exothermic combustion of coke on the catalyst in the regenerator is the principal source of energy used to reheat the catalyst to the desired temperature, so that upon return to the riser and/or reactor, the hot regenerated catalyst can heat and vaporize the incoming feedstock to the target cracking temperature as it enters the riser/reactor. When renewable feeds produce insufficient coke, the heat balance of the unit is disrupted and the regenerated catalyst temperature may fall, resulting in lower reactor inlet temperatures and suboptimal cracking and conversion of the feedstock.

To compensate for this energy shortfall, the FCC may be operated in such a way as to increase the amount of coke make and/or additional heat can be introduced into the system by one or more techniques. To increase coke make, at least a portion of the preheated renewable feed may be provided to the reactor bed section of the reactor section rather than being introduced solely into the riser. Without wishing to be bound to any particular theory, it is believed that injection of the renewable feed into the reactor (e.g., dense bed, stripper, or lower riser inlet region) can increase coke yield because the contacting of the feed under conditions of longer effective residence time and reduced lift-gas dilution favors cracking and other coke-forming reactions. In some embodiments, from about 5 vol % to about 95 vol % of the total renewable feed may be introduced into the riser and from about 95 vol % to about 5 vol % may be introduced into the reactor section, for example a split of about 20/80 to about 80/20, or more narrowly about 30/70 to about 70/30 (riser/reactor, vol/vol), or about 40/60 to about 60/40 (riser/reactor, vol/vol), or about 50/50 (riser/reactor, vol/vol), depending on the desired coke make and heat balance. In some embodiments, the split between the riser and the reactor may be dynamically controlled to maintain the overall system heat balance.

In another aspect, coke make can be deliberately increased by co-feeding one or more petroleum-derived coke precursor components with the renewable feedstock or injecting such coke precursors into the reaction section. Suitable petroleum-derived coke precursors include, but are not limited to aromatic and polyaromatic hydrocarbons (such as slurry oils, coker gas oils, and petroleum residues, etc.). By adjusting the type and proportion of petroleum-derived coke precursors in the blend with the renewable feed, an operator can modulate the overall coke yield to match the heat demand of the unit while still maintaining desired product quality and acceptable catalyst and regenerator operating conditions.

Alternatively or additionally, heat may be otherwise added to the system to maintain overall system energy balance. For example, the combustion air to the regenerator can be preheated by direct firing of fuel in the combustion air, addition of fuel (such as refinery fuel gas or other hydrocarbons) injected into the regenerator to increase coke-equivalent burning (e.g., torch oil), or a controlled amount of unstripped product hydrocarbons from the reactor may be allowed to reach the regenerator and burn as supplemental fuel within the regenerator. In addition, the feedstock itself can be further preheated upstream of the reactor section, thereby increasing the feed inlet temperature and partially offsetting the reduction in heat supplied by the regenerated catalyst. Combinations of these measures may be employed to restore or maintain the desired reactor temperature profile and overall FCC unit performance when processing low-coke renewable feedstocks. In some embodiments, the total amount of coke produced by the process ranges from about 0.5 wt. % to about 8 wt. %, for example from about 3 wt. % to about 7 wt. %, or more specifically from about 4 wt. % to about 6 wt. %, based on the total weight of the feed to the FCC.

Further issues arise from changes in product distribution when a renewable feedstock is processed in an FCC unit. Renewable feeds generally yield a product slate that is richer in lighter hydrocarbons and contains a reduced proportion of light cycle oil and slurry oil relative to conventional petroleum-derived feeds. The reduction in heavier hydrocarbon species in the FCC reactor product stream complicates operation of the main fractionator. In conventional service, the heavy bottoms stream provides a liquid vehicle for transporting catalyst fines and other solids that are carried over from the reactor section out of the FCC unit. When the amount of heavy material entering the fractionator is insufficient, the bottoms flow may be too low in both volume and density to effectively capture, entrain, and remove the catalyst fines, increasing the risk of solids accumulation, fouling, and maldistribution of vapor and liquid flow within the fractionator. In addition, due to the lower coke production and altered heat balance associated with renewable feeds, the reactor effluent temperature may be higher or differently profiled than in petroleum-derived operation.

To address these challenges, a method of feed preheating as provided herein involves introducing the renewable feedstock into a lower portion of the fractionator prior to routing the preheated feedstock to the FCC reactor section. In some embodiments, the renewable feedstock is preheated through direct or indirect contact with the hot FCC reactor products prior to injecting the preheated feed into the FCC. In some embodiments, the preheating is performed in a heat exchanger outside (or within) the fractionator. However, as described previously, it may be particularly advantageous to preheat at least a portion of the renewable feedstock within the fractionator. Therefore, in some embodiments, the preheating of the feedstock is due to heating of the feedstock by the hot FCC gases entering or within the fractionator.

In some embodiments, the renewable feedstock is heated by direct contact with the hot FCC reactor products entering or in the FCC. In this configuration, the hot FCC reactor product stream entering the upper portion of the fractionator transfers heat to the cooler renewable feedstock introduced near the bottom of the column. As the feedstock flows downward, it absorbs heat from the ascending product fractions (typically in vapor phase), thereby preheating the feedstock to a temperature suitable for FCC processing while simultaneously reducing the temperature of the FCC reactor product stream within the fractionator. This improves the thermal management and separation efficiency of the column.

The renewable feedstock may be introduced at or near the bottom of the column and recirculated to other points in the column by pumping. Introducing the renewable feedstock near the bottom region of the fractionator also provides an effective mechanism for managing catalyst fines and other solids carried over from the FCC reactor. The incoming feedstock can function as a liquid carrier phase in the bottoms section, contacting and entraining catalyst fines that would otherwise accumulate or be removed only with difficulty due to the low heavy-product yield. The resulting mixture of renewable feedstock and catalyst fines can then be withdrawn from the fractionator and directed to the FCC reactor section, where the fines are reintroduced to the circulating catalyst inventory, or alternatively, routed to product storage. In this way, the method not only enhances heat integration and fractionator performance but also promotes the recovery and recycling of catalyst fines back to the FCC unit, reducing catalyst losses and improving overall unit operability when processing renewable feedstocks.

Method for Producing Fuel from Renewable Feedstocks

Figure 2:
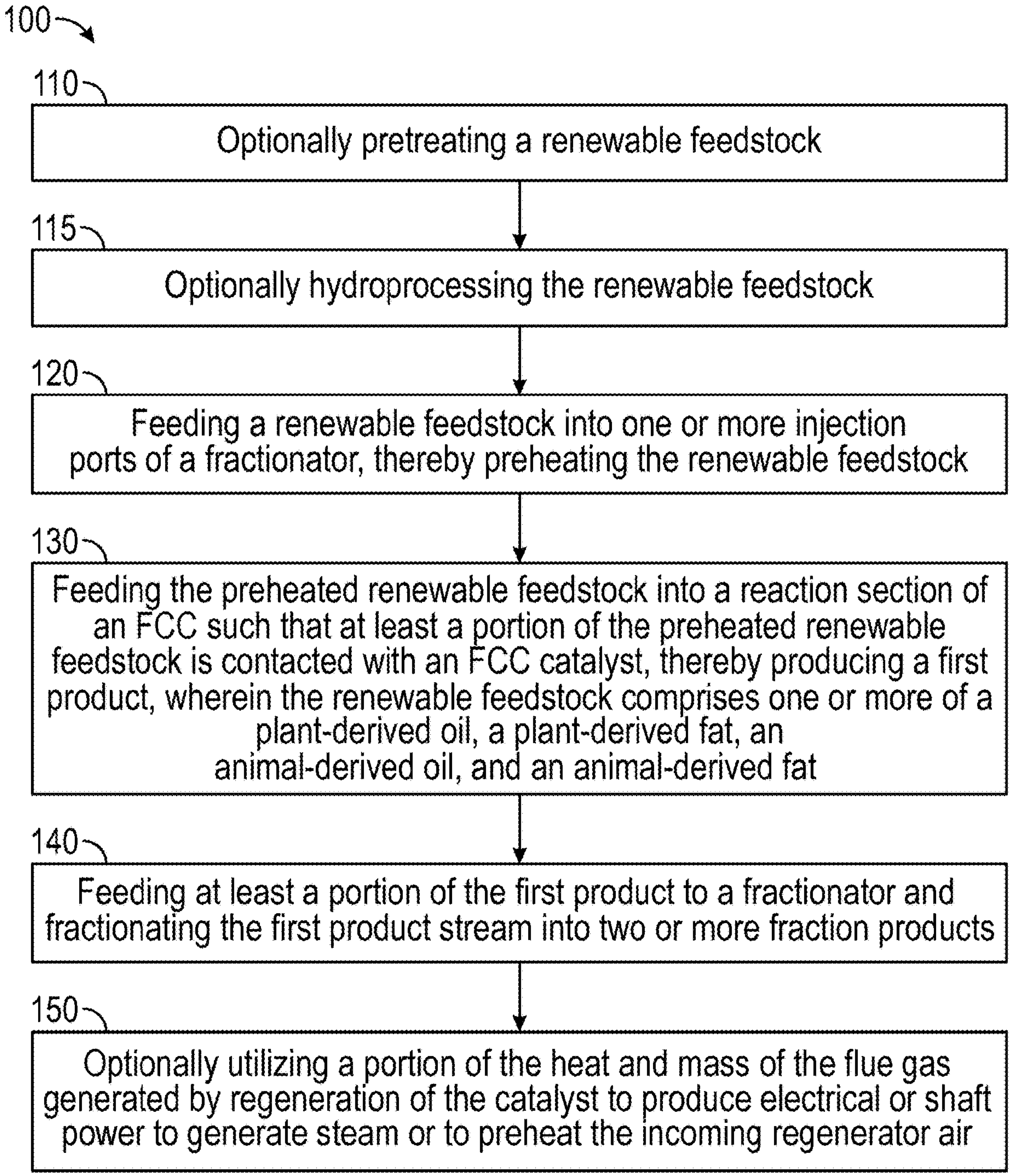
FIG. 2 is a flow chart showing a method of producing a renewable fuel product using a renewable feedstock via fluidized catalytic cracking wherein the method include heat and energy integrations.

Turning now to FIG. 2, a method of producing renewable fuel and products from a renewable feedstock by the use of a fluidized catalytic cracker is provided herein. In an aspect, which may be combined with any other aspect or embodiment herein, a method 100 of utilizing renewable feedstocks in an FCC unit may include a step of pretreating 110 the renewable feedstock. As discussed above, a pretreating step 110 can include one or more physical (filtration, phase separation, centrifugation, etc.), thermal, hydrothermal, and/or chemical treatments, as well as contacting the renewable feedstock with activated clays, adsorbents, filtration media, and/or ion exchange materials to reduce water, metals, phosphorous-containing compounds, chlorides, soaps, organic acids, and suspended solids to levels compatible with downstream FCC processing.

In some embodiments, the method may include an optional step 115 of hydroprocessing the renewable feedstock. The hydroprocessing step 115 may include one or more of hydrotreating, hydrocracking, hydrodeoxygenation, hydrodenitrification, hydrodesulfurization, isomerization, and hydroisomerization of the renewable feedstock. In some embodiments, the hydroprocessing step 115 is performed on a renewable feedstock that is pretreated as describe above. The hydroprocessing step 115 may hydrogenate olefinic and aromatic species, remove oxygen, sulfur, nitrogen or other heteroatoms, and/or improve the cold-flow and stability properties of the renewable feedstock or a portion thereof. The pretreated renewable material exiting the hydroprocessing step 115 may thus be a stabilized, partially or fully hydroprocessed stream. In some embodiments, the pretreated and/or hydroprocessed renewable feedstock has a boiling range suitable for FCC service (for example, about 250° F. to about 1150° F., or from about 300° F. to about 1100° F.) and a reduced concentration of petroleum-derived coke-forming precursors and catalyst poisons, thereby enabling its subsequent use as feed to a fractionation column and fluidized catalytic cracker as described herein.

If desired, the renewable feedstock material may be mixed with non-renewable material, such as petroleum-derived material, such that renewable feedstock is co-fed with the petroleum-derived material into the FCC. In certain embodiments, the petroleum-derived material may comprise atmospheric gas oil, vacuum gas oil, coker gas oil, deasphalted oil, or other conventional FCC feed components. When used, the non-renewable material can be added before or after the optional hydroprocessing step. The relative proportions of renewable and petroleum-derived materials can be adjusted to suit unit constraints and product and/or economic objectives. For example, in some embodiments the petroleum-derived material may constitute from about 10 wt. % to about 90 wt. % of the combined FCC feed, such as from about 20 wt. % to about 80 wt. %, from about 30 wt. % to about 70 wt. %, or from about 40 wt. % to about 60 wt. %. In other embodiments, the petroleum-derived material may be present only as a minor component (e.g., about 1 wt. % to about 25 wt. %) to facilitate handling, vaporization, and heat balance while maintaining a high renewable content.

Additionally or alternatively, if dictated by the energy balance of the FCC, petroleum-derived coke precursor materials may be added to the renewable feedstock to increase coke formation in the reaction section and, consequently, heat release in the regenerator. Suitable petroleum-derived coke precursor materials may include hydrocarbon streams enriched in olefinic and/or aromatic species, such as slurry oil, coker gas oil, petroleum residues, or combinations thereof. The petroleum-derived coke precursor material may be blended into the renewable feedstock, the co-feed petroleum stream, or introduced separately into the FCC reactor section, such as in the riser, reactor, and/or the catalyst bed of the reactor.

The proportion of petroleum-derived coke precursor material can be selected based on the observed or calculated heat deficit associated with processing the renewable feedstock. A portion of feedstock high in petroleum-derived coke precursors can be added to the renewable feedstock. In some embodiments, the material high in petroleum-derived coke precursors may be added in an amount of about 1 wt. % to about 50 wt. % of the total FCC feed, such as about 1 wt. % to about 40 wt. %, or about 2 wt. % to about 20 wt. %, or about 3 wt. % to about 10 wt. %, or about 5 wt. % to about 7 wt. %. Increasing the concentration of such petroleum-derived coke precursors in the combined feed can increase the coke yield on the circulating catalyst, thereby elevating the temperature of the regenerated catalyst and improving the ability of the FCC unit to heat and vaporize the incoming renewable-containing feed to the desired cracking temperature.

The amount of renewable material in the overall FCC feedstock may vary over a wide range. In certain embodiments, the renewable material may comprise at least about 5 wt. % of the total FCC feed, such as from about 5 wt. % to about 95 wt. %. In more specific embodiments, the renewable material may comprise about 10 wt. % to about 80 wt. %, about 20 wt. % to about 70 wt. %, or about 30 wt. % to about 60 wt. % of the total feed to the FCC unit. In other embodiments designed to maximize renewable content, the FCC feed may consist essentially of renewable material with none or only incidental or minor amounts (e.g., less than about 10 wt. %) of petroleum-derived or other non-renewable components. Thus, in some embodiments, the renewable material makes up 90 wt. % to about 99 wt. % or even 100 wt. % or substantially all of the feedstock.

The method 100 includes a step 120 of feeding the renewable feedstock to one or more injection ports of a fractionator, thereby preheating the renewable feedstock. In some embodiments, the renewable feedstock is provided to a lower section of the fractionator. In certain embodiments, the renewable feedstock is introduced at a location above an elevation at which the FCC reactor product is provided to the fractionator such that the liquid-phase renewable feedstock contacts the vapor-phase FCC reactor products ascending in the fractionator. In this way, the renewable feedstock can be preheated while also cooling the FCC reactor products. For example, the renewable feedstock may be introduced into the fractionator at a temperature of about 100° F. to about 400° F., such as about 150° F. to about 350° F., and may be heated within the fractionator to a temperature of about 500° F. to about 750° F., or about 550° F. to about 700° F., or about 600° F. to about 650° F., prior to being routed to the FCC unit. The FCC vapor products entering the fractionator from the reactor section may, in some embodiments, have a temperature of about 800° F. to about 1150° F., such as about 850° F. to about 1100° F., or about 900° F. to about 1000° F., about 920° F. to about 1000° F. Heat exchange between the hot FCC vapor products and the relatively cooler renewable feedstock within the column can reduce the FCC vapor temperature by, for example, about 25° F. to about 200° F., improving fractionation efficiency while simultaneously elevating the renewable feedstock to a temperature suitable for FCC cracking.

Depending on the precise composition of the renewable feedstock, a portion of the renewable feedstock will vaporize within the fractionator and will be collected as part of the product fractions. For example, lower-boiling components present in the renewable feedstock may be recovered in the overhead and upper side draws as light gases (e.g., $C_1$-$C_2$), liquefied petroleum gas (LPG, e.g., $C_3$-$C_5$), and light naphtha or gasoline-range material. Intermediate-boiling components may be recovered as heavier naphtha, kerosene, and diesel boiling-range fractions, while still heavier species, including partially converted renewable material, may report to the cycle oil and slurry or bottoms fractions. I Furthermore, addition of the renewable feedstock into the fractionator assists with controlling the amount of catalyst accumulation in the fractionator due to carryover of the catalyst with the FCC reactor products. Catalyst fines and other entrained solids that pass through the reactor-side separation equipment (e.g., cyclones, baffles) and enter the fractionator with the FCC vapor products tend to concentrate in the lower sections of the fractionator column. By introducing a sufficient flow of liquid-phase renewable feedstock into this region, the fines can be captured and entrained in the descending liquid, rather than accumulating on trays, structured packing, or in dead zones of the column. The renewable feedstock thus acts as a liquid transport medium, sweeping catalyst fines toward the fractionator bottoms and into a combined stream that can be withdrawn and routed to the FCC reaction section or feed system. In this manner, catalyst fines are effectively removed from the fractionator, reducing fouling and erosion, while at least a portion of the fines are recycled back to the FCC unit as part of the circulating catalyst inventory.

Alternatively or in addition, the FCC reactor product stream may be used to indirectly preheat the renewable feedstock. For example, in some embodiments, at least a portion of the FCC reactor product and a least a portion of the renewable feedstock are provided to a heat exchanger such that the hot FCC reactor product stream heats the renewable feedstock. When a heat exchanger is used, a portion of the renewable feedstock material may still be provided to a lower section of the fractionator to sweep catalyst fines, as described above, with or without direct heat transfer between the FCC reactor products and the renewable feedstock.

The method 100 includes a step 130 of feeding the preheated renewable feedstock into a reaction section of the fluidized catalytic cracker such that at least a portion of the preheated renewable feedstock is contacted with an FCC catalyst, thereby producing the FCC reactor product stream. In certain embodiments, the preheated renewable feedstock, optionally co-fed with one or more petroleum-derived streams and/or petroleum-derived coke precursor streams as described previously, is injected into the reactor section where it is contacted with a flow of hot FCC catalyst. In certain embodiments, at least a portion of the preheated renewable feedstock is provided to the reactor of the reactor section, above the riser. In some embodiments, a portion or all of the preheated renewable feedstock is provided to the riser of the reactor section. As discussed previously, the feedstock may be split between the riser and the reactor with the split ranging from between about 20/80 to about 80/20 (riser/reactor, vol/vol), or more narrowly about 30/70 to about 70/30 (riser/reactor, vol/vol), or about 40/60 to about 60/40 (riser/reactor, vol/vol), or about 50/50 (riser/reactor, vol/vol), depending on the desired coke make and heat balance. In some embodiments, the split between the riser and the reactor may be dynamically controlled to maintain the overall system heat balance.

The FCC catalyst may be any FCC catalyst known or unknown in the art. For example, the catalyst may comprise one or more zeolite-containing materials, optionally including clay, silica, alumina, and other additives or rare-earth-containing components. The hot regenerated catalyst, typically at a temperature of about 1200° F. to about 1450° F. (about 650° C. to about 790° C.), supplies the heat necessary to vaporize and heat the incoming renewable-containing feed to the desired cracking temperature, which in some embodiments may be about 900° F. to about 1150° F. (about 480° C. to about 620° C.) at the FCC outlet, as previously described.

The renewable feed to the FCC is mostly paraffinic C16-C18 hydrocarbon that has been produced from the hydrodeoxygenation of the pretreated fats, oils, triglycerides, and free fatty acids. As the preheated renewable feedstock contacts the catalyst in the reaction section, cracking, and to a smaller degree, deoxygenation, isomerization, and other catalyzed reactions, occur over a short residence time, generally on the order of a few seconds or less. Paraffins, hydrocarbons, triglycerides, free fatty acids, and other species present in the renewable feed are thermally and catalytically decomposed and rearranged to form lighter hydrocarbons, including gasoline-range components, light olefins (e.g., propylene and butenes), LPG-range materials, and middle-distillate-range components that can serve as diesel and jet/SAF blend stocks. The endothermic cracking reactions are balanced by the exothermic combustion of coke on the catalyst in the regenerator, such that the overall FCC unit maintains a heat balance between the reactor/riser and regenerator. When processing renewable feedstocks, which inherently yield less coke, the heat balance may be supplemented by the addition of petroleum-derived coke precursor streams, preheat of the feed and/or combustion air, or other measures as described herein to maintain sufficient regenerated catalyst temperature and reactor inlet conditions.

Within the reactor, a mixture of cracked hydrocarbon vapor and a small amount of spent catalyst carryover is discharged into a separation zone, which may include one or more cyclones, baffles, or disengaging devices configured to separate the FCC reactor product stream from the catalyst. The separated FCC reactor product stream, containing vapor-phase cracked products and steam, is routed to the fractionator for further cooling and separation into one or more product fractions as described with respect to step 120. The spent catalyst, which now contains coke deposited during the cracking reactions and may carry a reduced amount of entrained hydrocarbons due to upstream stripping, is directed to a regenerator section. In the regenerator, the spent catalyst is contacted with an oxygen-containing gas, such as air, under controlled conditions to combust at least a portion of the coke, generating a hot flue gas and reheating and reactivating the catalyst. The regenerated catalyst is then returned to the riser, closing the catalyst circulation loop and sustaining the FCC reaction.

When renewable material is present in the feedstock, the product profile produced in step 130 generally differs from that obtained when processing only petroleum-derived feeds. Renewable feeds rich in paraffinic and isoparaffinic species result in lower yields of cycle oil and slurry oil. As a result, the FCC reactor product stream may be shifted toward lighter products, such as gasoline, LPG, and light olefins, with a reduced proportion of heavy, high-boiling material compared to conventional petroleum-derived feeds. This lighter product profile contributes to the challenges discussed above in connection with fractionator operation (e.g., lower bottoms yield and reduced capacity to transport catalyst fines), but it also provides the opportunity to produce significant quantities of renewable gasoline and renewable petrochemical feedstocks from bio-derived or other renewable oils and fats. The methods disclosed herein address both the process integration and heat-balance requirements associated with introducing renewable feedstocks into the FCC while taking advantage of the cleaner and lighter, high-value product slate that such feedstocks can generate.

The method 100 may also include a step 140 of fractionating the FCC reactor product stream to produce one or more renewable products. In step 140, the vapor-phase FCC reactor product stream is introduced into a fractionation column (e.g., a main fractionator) where it is separated by distillation into multiple product cuts based on boiling range. In some embodiments, the fractionator is the same as that used to preheat the renewable feedstock. In certain embodiments, the FCC reactor product stream is cooled and partially condensed as it enters the column, and internal vapor-liquid contacting devices (such as trays or packing) provide the mass transfer necessary to achieve the desired separation. The fractionator may be operated to produce an overhead stream rich in C5, C4, C3, and/or lighter components, one or more naphtha-range side draws, and one or more middle-distillate-range and heavier side draws or bottoms streams. The fractionator may be operated such that the bottoms temperature is in the range of about 400° F. to about 800° F., about 500° F. to about 750° F., or about 520° F. to about 720° F., or any desired range as appropriate to collect the desired cuts.

In some embodiments, the fractionation step 140 produces an overhead stream comprising C3, C4, and C5 hydrocarbons, including light olefins such as propylene and butenes, which can be used as renewable petrochemical feedstocks or LPG blend components. Below the overhead section, a naphtha-range fraction is withdrawn, which may be further separated into light cat naphtha and heavy cat naphtha. Light cat naphtha typically has an approximate initial boiling point in the range of about 80° F. to about 180° F. and an end point of about 250° F. to about 300° F., while heavy cat naphtha generally boils from about 250° F. to about 430° F. These naphtha fractions can serve as renewable gasoline blendstocks or as feedstocks for downstream petrochemical units (e.g., reforming, isomerization, or olefin production).

At intermediate elevations in the fractionator, a light cycle oil (LCO) side draw may be recovered. LCO typically has a boiling range of about 430° F. to about 650° F. and can be used as a renewable diesel or jet/SAF blendstock after appropriate hydrotreating or other finishing steps. In some embodiments, a heavy cycle oil (HCO) or oil/slurry-type stream is withdrawn from a lower section or from the column bottoms. HCO and slurry fractions generally boil above about 650° F. and can contain higher concentrations of aromatics and, in the case of slurry oil, suspended catalyst fines. For renewable-containing feeds, these heavy fractions may be present in reduced quantities compared to conventional operation, but where obtained, they may be routed to fuel oil service, further upgrading units, or recycled to the FCC unit for further processing or as part of the overall heat-balance strategy. In some embodiments, heavier products are recycled to the FCC until extinction (i.e., until substantially all of the material is converted into lighter products). Other possible fractions, depending on the operating conditions of the fractionator and the composition of the FCC reactor product stream, including naphtha, gasoline, kerosene, and diesel fractions.

Because the FCC feed includes renewable material, each of the aforementioned fractions contains and can be assigned a renewable carbon content, enabling the production of renewable naphtha, renewable LPG, renewable LCO (for renewable diesel or jet/SAF blending), and, where present, renewable heavy cycle or slurry products. In some embodiments, a carbon intensity of the products produced is less than 50 g $CO_2$e per MJ of energy of the fuel. For example, in some embodiments, a carbon intensity of the products produced is less than 50 g $CO_2$e per MJ, less than 40 g $CO_2$e per MJ, 30 g $CO_2$e per MJ, 25 g $CO_2$e per MJ, or even less than 20 g $CO_2$e per MJ of energy of the fuel The specific draw locations, cut points, and relative flow rates of the overhead, naphtha, LCO, HCO, and slurry streams in step 140 can be adjusted to tailor the product slate to desired specifications and to accommodate the altered boiling range distribution associated with renewable FCC feeds.

The method 100 may include another step 150 in which a portion of the heat generated during catalyst regeneration is recovered and used to provide power to a compressor and/or to preheat the regenerator air feed. The catalyst regenerator requires an oxygen-containing gas, typically air, although oxygen-enriched air may be used to achieve higher regeneration temperatures or to adjust the unit heat balance. In some embodiments, the flue gas or hot exhaust from the regenerator is routed through one or more heat-recovery devices, such as turboexpanders, waste-heat boilers, and/or air preheaters. Energy recovered from the hot regenerator effluent can be used to drive, at least in part, compressors and/or pumps for the combustion air system. Heat recovered can also generate steam, which may be used in other plant services. Additionally or alternatively, the hot exhaust stream can be used, directly or indirectly, to preheat the regenerator air feed upstream of the regenerator, thereby reducing the net fuel or coke requirement needed to maintain the desired regeneration temperature. These heat-integration schemes improve overall energy efficiency and help maintain the thermal balance of the FCC unit when processing low-coke renewable feeds.

The cooled regenerator waste gas can be cleaned and prepared for $CO_2$ capture and sequestration. In some embodiments, the treated flue gas is routed to a $CO_2$ capture unit, such as an amine-based absorption system, physical solvent system, adsorption unit, membrane separation system, cryogenic separation system, or combinations thereof, to selectively remove a portion of the $CO_2$ contained in the regenerator waste gas. The resulting $CO_2$-rich stream may be compressed, dehydrated, and transported for permanent geological sequestration, enhanced oil recovery, or other long-term storage or utilization, while the $CO_2$-lean flue gas is vented or further treated. By integrating $CO_2$ capture with an FCC unit processing renewable feedstocks, the overall lifecycle carbon intensity of the produced renewable fuel products can be further reduced, potentially enabling the fuels to qualify for low-carbon fuel credits, regulatory incentives, and more stringent decarbonization targets.

Collectively, these steps provide an integrated approach for incorporating renewable feedstocks into FCC operation while addressing the unique thermal, catalytic, and fractionation challenges associated with renewable materials. These steps are presented as non-limiting embodiments and need not be performed in the specific order described, and one or more of the steps may be omitted, combined, or rearranged and may be carried out in a continuous or semi-continuous manner as appropriate for a given implementation. Collectively, the disclosed methods provide an integrated approach for incorporating renewable feedstocks into FCC operation while addressing the unique thermal, catalytic, and fractionation challenges associated with renewable materials.

Systems for Producing Fuel from Renewable Feedstocks

Figure 3A:
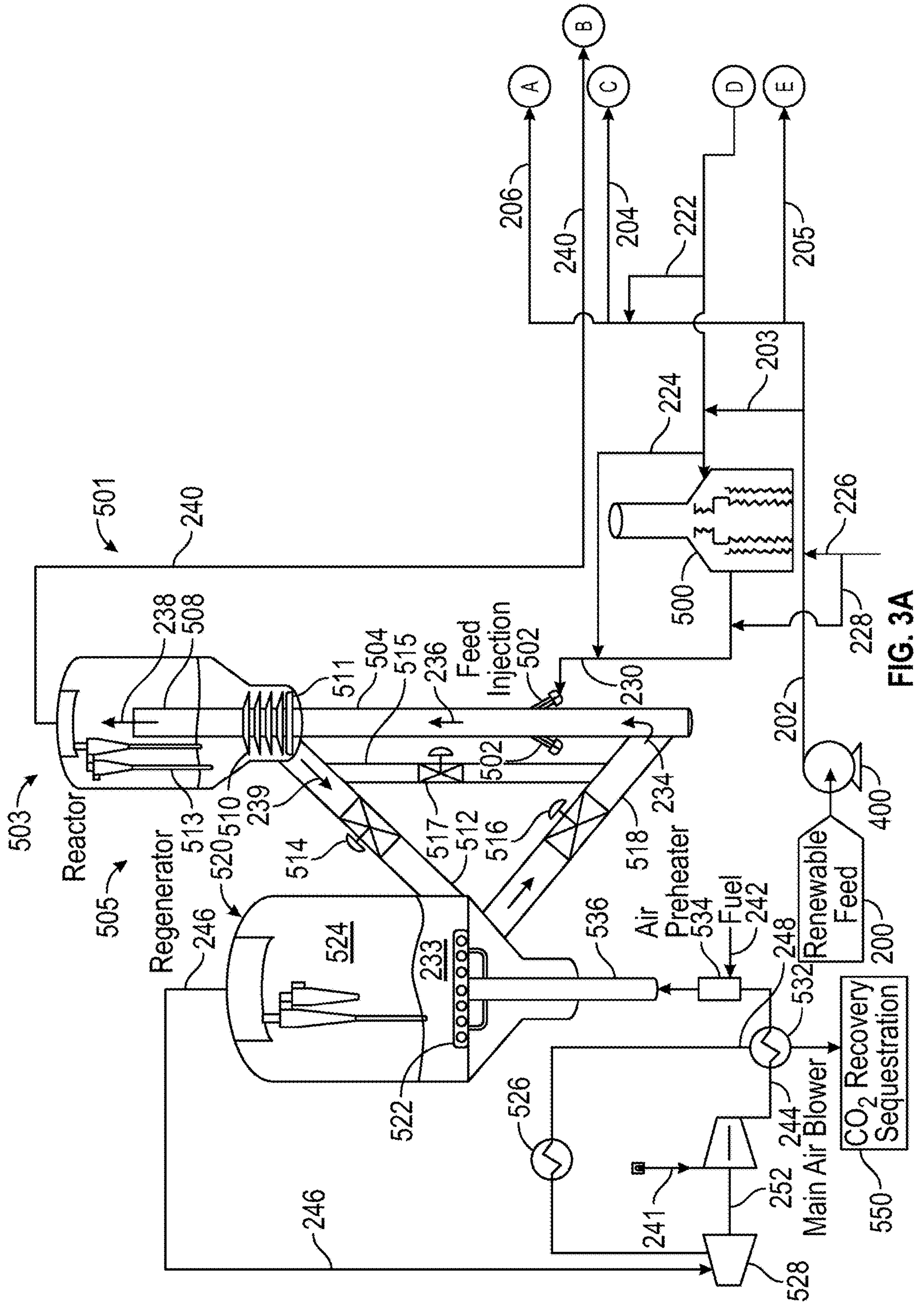
FIGS. 3A and 3B are a schematic of a process flow diagram illustrating a process flow of a system for producing a renewable fuel product with an FCC utilizing heat and energy integration, according to some embodiments.
Figure 3B:
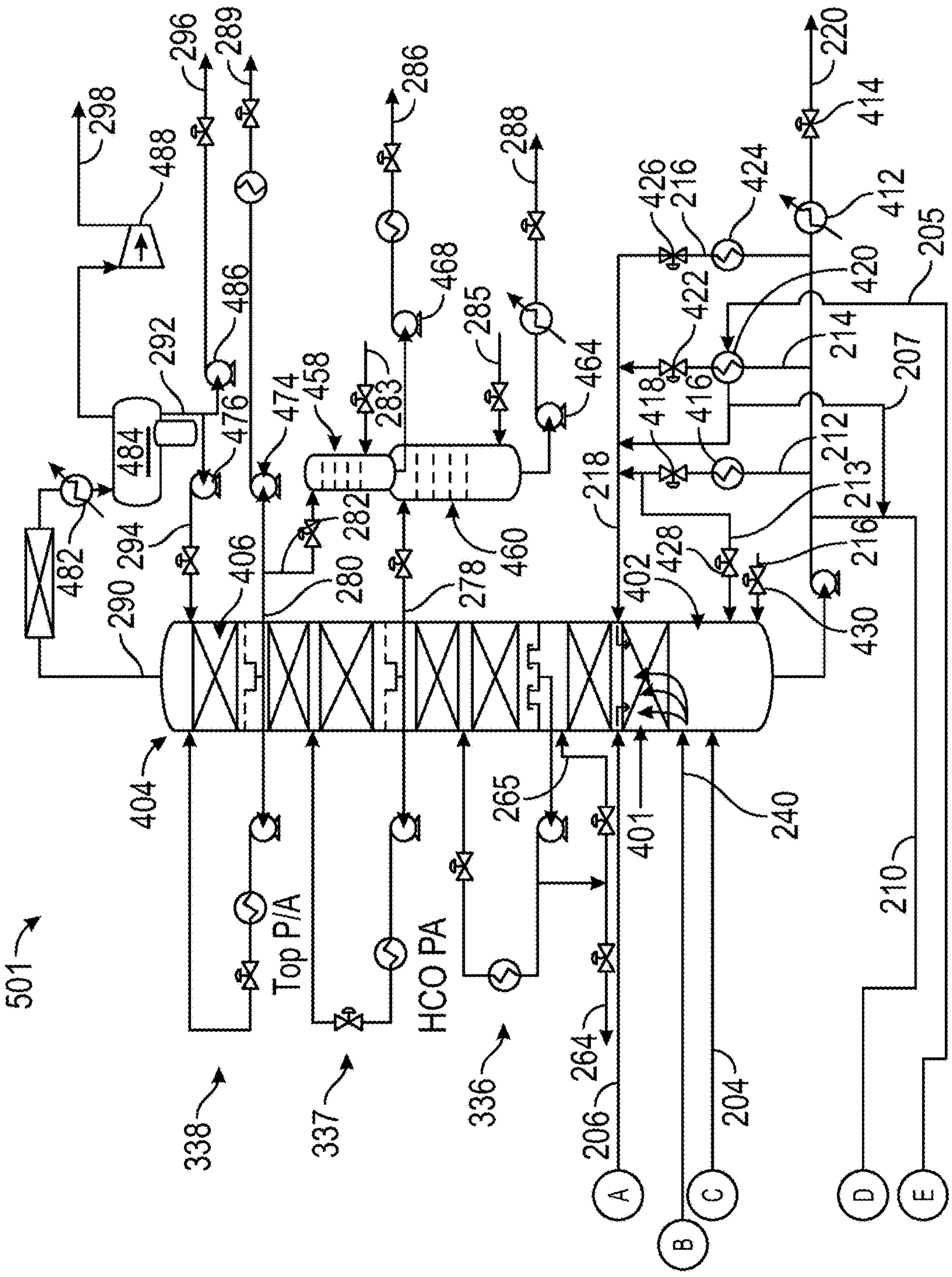

Also provided herein are systems and process configurations for co-processing renewable feeds in a fluid catalytic cracking (FCC) unit with optional product fractionation, recycle, coke management, and carbon capture capabilities. Referring to FIGS. 3A and 3B, a system 501 may be adapted to carry out the methods provided herein. In an aspect, which may be combined with any other aspect or embodiment herein, a system 501 is configured to receive a renewable feedstock material and to convert it to one or more product streams using an FCC unit 503. A renewable feedstock 200 is obtained from bio-based sources and comprises one or more plant- or animal-derived oils and/or fats. Plant-derived materials may include, but are not limited to, vegetable oils such as soybean, canola (rapeseed), palm, corn, and/or sunflower oil. Animal-derived materials may, but are not limited to include tallow, lard, and/or poultry fat. Additional renewable sources can include used cooking oils such as recycled cooking oil from restaurants or other commercial facilities, yellow grease, and oils or lipids derived from algae (algal oils). The source of material for the renewable feedstock 200 is not particularly limited and may further include plant materials, food waste, dairy waste, restaurant waste, certain municipal solid waste, food-production waste, and other streams that can be processed or upgraded to yield an oil- or fat-rich fraction suitable for use as a renewable feedstock. The renewable feedstock, in some embodiments, comprises fats, oils, triglycerides, and free fatty acids derived from renewable sources (i.e., plants, animals). The renewable feedstock 200 may be pretreated to remove contaminants and may be hydroprocessed before introduction to the system 501.

In some embodiments, the renewable feedstock 200 is used alone; in other embodiments, the renewable feedstock 200 is blended with one or more petroleum-derived streams (e.g., atmospheric gas oil, vacuum gas oil, coker gas oil, or other conventional FCC feed materials) and/or with petroleum-derived coke precursor materials 226 228, as discussed herein, to form a combined FCC feed. The petroleum-derived coke precursor materials may be mixed with the renewable feedstock at any point before the feedstock is provided to the FCC. As an example, as illustrated in FIG. 3, the petroleum-derived coke precursor materials are shown being added to the renewable feedstock 200 before any preheating of the feedstock is performed (see stream 226) and after the renewable feedstock 200 is provided to a furnace 500 or other heater (see stream 228).

The renewable feedstock 200 may be pretreated as described previously to render it compatible with FCC 503 and associated fractionation 404 and regeneration equipment 520. In certain embodiments, pretreatment is configured to remove or reduce contaminants, minerals (e.g., alkali and alkaline-earth metals), solids, gums, and water. The pretreatment may include one or more of acid treatment, centrifugation, filtration, decantation, thermal or hydrothermal conditioning, and/or chemical neutralization of free fatty acids. Alternatively or additionally, clay (e.g., bleaching earths or other activated clays) may be added to the renewable feedstock 200 to capture contaminants such as metals, peroxides, and color bodies, followed by filtration or other solids-removal steps. In further embodiments, pretreatment can incorporate adsorption media (e.g., silica- or alumina-based adsorbents) and/or ion exchange materials to remove polar compounds, metals, and halides.

The renewable feedstock may also optionally be subjected to one or more hydroprocessing steps prior to use in the FCC. The hydroprocessing steps may include one or more of hydrotreating, hydrocracking, hydrodeoxygenation, hydrodenitrification, hydrodesulfurization, isomerization, and hydroisomerization to at least partially hydrogenate unsaturated species, remove oxygen, sulfur, nitrogen and other heteroatoms, and improve cold-flow properties. The resulting hydroprocessed renewable feedstock may thus have a controlled boiling range (for example, having a liquid portion with a boiling point of about 250° F. to about 1150° F.) and reduced levels of catalyst poisons, making it suitable for subsequent introduction into a fractionator 404 and fluidized catalytic cracker 503 as described herein.

At least a portion of the prepared renewable feedstock 200 is preheated using heat from the FCC reactor product stream 240, either through direct or indirect contact/heat exchange. In some embodiments, heat is indirectly exchanged between the renewable feedstock 200 and the FCC reactor product stream 240 in one or more heat exchangers. Single- or multi-stage heat exchange may be used. In certain embodiments, only a fraction of the total FCC reactor product stream 240 is routed through the heat exchanger(s) for thermal integration with the renewable feedstock 200. Likewise, in some embodiments, only a portion of the total renewable feedstock 200 may be subjected to such preheating.

In some embodiments, at least a portion of the renewable feed 200 is preheated by direct heat exchange with the FCC reactor products 240. As illustrated in FIGS. 3A and 3B, one configuration includes providing the renewable feedstock 200 to the fractionator 404 where it may contact or otherwise exchange heat with the FCC reactor product stream 240. In some embodiments, and if required to maintain the overall energy balance of the system 501, a portion of the renewable feedstock 203 may bypass the fractionator 404 and be combined downstream with a preheated feedstock stream 210 (either via direct or indirect heat exchange). The renewable feedstock 200 may be introduced into the fractionator 404 as a lower stream 204 near a bottom section 402 of the fractionator 404 and/or as an upper stream 206 at a higher elevation. In certain embodiments, the lower stream 204 is provided at an elevation below that at which the hot FCC reactor product stream 240 enters the fractionator 404, such that the renewable feedstock introduced as the lower stream 204 has limited or no direct contact with the hot FCC reactor product stream 240 within the column. In contrast, the renewable feedstock in the upper stream 206 is provided in liquid form above the FCC reactor product injection point, so that it directly contacts the hot FCC reactor product 240 vapor as the vapor rises through the fractionator 404. One or more packings and/or trays 401 may be included in the fractionator to improve contact between the streams.

Within the fractionator column 404, the renewable feedstock introduced as the upper stream 206 exchanges heat with the rising hot FCC reactor product vapors, cooling and partially condensing the vapors while preheating the renewable feedstock to a temperature suitable for introduction to the FCC reaction section. In some embodiments, the renewable feedstock 200 may enter the fractionator 404 at a temperature of about 100° F. to about 500° F. and be heated within the column to about 500° F. to about 750° F., while the FCC reactor product stream 240 may enter the fractionator 404 at a temperature of about 800° F. to about 1150° F. and be cooled by about 25° F. to about 200° F. as it rises and contacts the renewable feedstock. The liquid phase provided by the upper stream 206 also captures and entrains catalyst fines (and other solids or heavy material) that are carried over with the FCC reactor product stream 240 from the reactor section, thereby reducing catalyst accumulation and fouling in the fractionator 404. The resulting mixture of preheated renewable feedstock 208 and captured catalyst fines can then be withdrawn from the fractionator 404 and later be directed as part of the feed to the FCC reaction section 505, allowing at least a portion of the fines to be recycled into the circulating catalyst inventory.

The split between the upper and lower renewable feedstock streams 206 and 204 can be adjusted to ensure that temperatures within the bottom section 402 of the fractionator 404 are maintained within an acceptable range and that sufficient liquid is available to transport catalyst fines. In some embodiments, the bottom section 402 is preferably maintained at a temperature of less than about 700° F., or less than about 650° F., and in certain embodiments at about 600° F. or less, to protect column internals, reduce thermal degradation of heavy components, and maintain an adequate liquid phase for fines removal. By varying the relative flow rates of the upper stream 206 and lower stream 204, and by optionally bypassing a portion 203 of the renewable feedstock around the fractionator 404, the system can be tuned to balance feed preheat, FCC reactor product cooling, fractionation efficiency, and solids management while accommodating changes in feed composition, renewable content, and unit heat balance. Optional steam 215 may be added to the system to increase or decrease heat within the fractionator, with the steam flow controlled by one or more valves 430.

As illustrated in FIGS. 3A and 3B, several heat-integration options are available for the preheated feedstock stream 208. In some embodiments, the preheated feedstock stream 208 is pressurized by one or more pumps 410 to generate one or more branch streams for heat recovery and redistribution or recycling. These embodiments allow for careful control of heat energy and mass flow within the system 501. For example, at least a portion of the preheated feedstock stream 212 may be passed through one or more steam generators 416, where heat from the stream 212 is used to produce steam for use within the FCC unit 503 or elsewhere in the refinery. In some embodiments, at least a portion of the preheated feedstock stream 214 is passed through one or more heat exchangers 420 that serve to preheat a portion of the renewable feedstock 205 that bypasses the fractionator 404. A portion of the resulting partially preheated feedstock stream 207 may be joined with a recycle stream 218 for reinjection into the fractionator while another portion of the resulting partially preheated feedstock stream 207 may bypass the fractionator 404 and rejoin the preheated feedstock stream 210 upstream of the FCC 503, allowing flexibility in how much renewable feedstock is heated in-column versus externally. As the split between the recycle and bypass lines is adjustable, the arrangement permits management of the total mass flow through the fractionator while still capturing a predetermined amount of energy from the hot FCC reactor products while accounting for size and capacity of the fractionator 404 and other equipment in the system. In other embodiments, a further portion of the preheated feedstock stream 216 is routed to one or more process reboilers 424, where heat is transferred from the renewable-containing stream to generate vapor or steam for use in other portions of the FCC unit 503 (e.g., strippers) or in other associated process units. In each of these configurations, which may be used alone or in combination with one another, fluid flow and distribution of the various streams are managed by one or more control valves 418, 422, 426, and 428 to maintain desired temperatures, pressures, and flow rates throughout the system.

Each of these embodiments contemplates that at least a portion of the preheated feedstock stream may be recycled 218 back to the fractionator 404. Similar to the renewable feed streams 206 and 204, the recycle streams may be introduced into a lower portion of the bottom section 402 below the elevation at which the FCC reactor product stream 240 enters the fractionator 404 (see stream 213), or at an elevation above the FCC reactor product entry point (see stream 218). The recycled streams thus may participate in additional internal heat exchange with the rising FCC reactor products and provide additional liquid for catalyst fines capture and entrainment, as previously described for streams 204 and 206.

A slurry product stream 220 may be separated from the preheated renewable feedstock 208 and withdrawn from the system. The slurry product stream 220 carries heavier bottoms material, catalyst fines, and other solids/non-volatiles that have accumulated in the fractionator 404 and associated piping. Heat may be recovered from the slurry product stream 220 via one or more heat exchangers 412, with flow and duty controlled by one or more valves 414, thereby improving overall energy efficiency. The mass flow rate of the slurry product stream 220 may vary depending on operating conditions, feed quality, and the proportion of renewable versus petroleum-derived material in the FCC feed, but in typical embodiments the slurry product stream may amount to about 3 wt. % to about 5 wt. % of the total renewable feedstock 200 provided to the system.

With continued reference to FIGS. 3A and 3B, a preheated renewable feedstock stream 210 is directed toward the fluidized catalytic cracker (FCC) 503. Before entering the FCC 503, a portion of the preheated renewable feedstock stream 210 may be provided to a furnace 500 if additional heat is required to achieve a target feed inlet temperature. The preheated renewable feedstock stream 210 may be joined with, in some embodiments, a preheated bypass renewable feedstock stream 207, a non-preheated bypass stream 203, and/or a petroleum-derived coke-precursor-carrying stream 228. In some embodiments, it is preferable to add the petroleum-derived coke precursors after preheating of the renewable feedstock has been accomplished to avoid breaking down the petroleum-derived coke precursors. Not shown in FIGS. 3A and 3B, one option may include hydroprocessing of the preheated renewable feed and/or addition of non-renewable material (e.g., petroleum-derived fuels/material) into the renewable feedstock 210, such that the renewable feedstock is a co-feed of renewable and non-renewable materials. In some embodiments, the renewable feedstock comprises substantially all renewable material (i.e., about 100 wt. % renewable material). In other embodiments, non-renewable materials make up about 1 wt. %, 2 wt. %, 3 wt. %, 4 wt. %, 5 wt. %, 6 wt. %, 7 wt. %, 8 wt. %, 9 wt. %, or 10 wt. % or more of the feed. In still other embodiments, non-renewable material may be added to the FCC at different injectors 502 in the FCC 503.

A portion of the preheated renewable feedstock stream 210 may be recycled to the renewable feedstock stream 202 via one or more bypass streams (see stream 222, for example) to provide additional flexibility in controlling temperature and flow. At least a portion of the preheated renewable feedstock stream 210 may bypass the furnace 500 via a furnace bypass stream 224, allowing mixed operation in which only part of the flow is subjected to additional heating. The resulting prepared renewable feedstock stream 230, comprising the renewable feedstock and, optionally, non-renewable material and/or petroleum-derived coke precursor materials, is thus produced with a controlled temperature profile. In some embodiments, the prepared renewable feedstock stream 230 is preheated to about 300° F. up to about 900° F., or to about 400° F. to about 850° F., or to about 450° F. up to about 650° F., or to about 450° F. up to about 500° F., or to about 500° F. up to about 550° F., before being introduced into the FCC reaction section 505, such as the riser 504 or the reactor 506, or both.

Continuing with reference to FIGS. 3A and 3B, the prepared renewable feedstock 230 is provided to one or more injectors 502, which direct the feedstock into the reaction section of the FCC 503 where it is contacted by hot catalyst 234. The hot catalyst 234 enters the riser section 504 from a catalyst feed channel 518, with the catalyst flow rate controlled by one or more valves 516 to maintain a desired catalyst-to-feed ratio and temperature profile up the riser section 504. In some embodiments, the hot catalyst 234 may also include a portion of spent or partially regenerated catalyst supplied via a catalyst bypass line 515, with the flow through the bypass line regulated by one or more bypass valves 517 to control catalyst circulation rate and catalyst inventory in the reactor and associated catalyst bed. In all cases, the catalyst 234 entering the riser has sufficient temperature and catalytic activity to convert the renewable feedstock 230 to the desired FCC reactor product stream.

The FCC catalyst may be any FCC catalyst known or unknown in the art. For example, the catalyst may comprise one or more zeolite-containing materials (e.g., Y-type or USY zeolites) in a porous matrix, optionally including clay, silica, alumina, and other additives or rare-earth-containing components. The hot regenerated catalyst 234, typically at a temperature of about 1200° F. to about 1450° F. (about 650° C. to about 790° C.), supplies the heat necessary to vaporize and heat the incoming renewable-containing feed to the desired cracking temperature, which in some embodiments may be about 900° F. to about 1150° F. (about 480° C. to about 620° C.) at the riser outlet 508, as previously described.

As the preheated renewable feedstock contacts the catalyst in the reaction section 505, cracking and, to a smaller degree, deoxygenation, isomerization, and other catalyzed reactions 236 occur over a short residence time within the riser 504 and/or reactor 506, generally on the order of a few seconds or less. Triglycerides, free fatty acids, and other oxygenated species present in the renewable feed are thermally and catalytically decomposed and rearranged to form lighter hydrocarbons, including gasoline-range components, light olefins (e.g., propylene and butenes), LPG-range materials, and middle-distillate-range components that can serve as diesel and jet/SAF blendstocks. Because renewable feeds tend to be more paraffinic and oxygenated and contain fewer heavy aromatics than conventional vacuum gas oil feeds, the product slate is typically shifted toward lighter, less aromatic products with reduced yields of heavy cycle oil and slurry oil.

The endothermic cracking reactions in the riser 504 and/or reactor 506 are balanced by the exothermic combustion of coke on the catalyst in the regenerator 524, such that the overall FCC unit 503 maintains a heat balance between the reactor/riser 504 506 and regenerator 520. In conventional FCC operation, the coke deposited on the catalyst by cracking of petroleum-derived feeds provides the primary fuel for the regenerator 524. When processing renewable feedstocks, which inherently yield less coke, the heat balance may be supplemented by the addition of petroleum-derived coke precursor streams (see streams 226 and 228, for example), increased preheat of the feed and/or combustion air, or other measures as described herein to maintain sufficient regenerated catalyst temperature and reactor inlet conditions.

While the injectors 502 are illustrated positioned on the riser of the reactor section 505, injectors may additionally or alternatively be placed in the reactor 506 or other portions of the reactor section 505. As described previously, it may be advantageous to the overall heat balance of the system to provide at least a portion of the renewable feedstock to the reactor 506 so as to increase the amount of coke make in the reactor section. Alternatively, or in addition, petroleum-derived coke precursors may be added to the reactor section separately from the renewable feedstock. The petroleum-derived coke precursors may include olefinic, diolefinic, aromatic, or other material to increase coke make within the reactor section, such as but not limited to slurry oil, coker gas oil, and petroleum residue, or a combination thereof.

Spent catalyst 239 is separated from the hot FCC reactor products 240 by a catalyst separation system, which may include, for example, baffles 510, steam strippers 511, and/or cyclones 513 or other suitable equipment configured to maximize release of FCC reactor products from the catalyst and to minimize catalyst carryover to the fractionator 404. The catalyst separation system reduces the concentration of entrained solids in the FCC reactor product stream 240 while allowing the hydrocarbon vapors to pass overhead toward the fractionator 404. The spent catalyst 239 is returned to the regenerator 520 via a catalyst return channel 512, with the flow of spent catalyst controlled by one or more valves 514 such that a desired level of catalyst in the reactor section 506 is maintained and stable circulation between the reactor/riser and regenerator is achieved.

Within the regenerator 520, coke on the spent catalyst reacts with oxygen provided by the regenerator air feed 244. The air feed 241 is compressed using one or more compressors 530 to produce the regenerator air feed 244, which has sufficient pressure to be injected into the regenerator 520. If needed, supplemental fuel 242 may be added to an air preheater 534 to ensure the regenerator air feed 244 enters with sufficient heat load to cause combustion of the coke on the spent catalyst 233 stored in the regenerator 520 524. An air distributor 522 may be used to ensure the air flow is spread across a wide area of the regenerator, ensuring nearly complete combustion of any coke present on the catalyst 233.

In some embodiments, hot flue gas 246 from the regenerator 520 is routed to waste heat recovery equipment. For example, an optional waste heat boiler 526 may recover some of the heat energy from the hot flue gas 246 to generate steam and/or electrical power for use in the FCC or other processes in the refinery. In another example, an expander 528 is used to generate electricity or compressive power which can be used to drive air compressors 530 or other process equipment, further supporting the thermal integration of the system. In a further example, hot flue gas 246 may be used in one or more heat exchangers 532 to at least partially preheat air entering the regenerator 520. After the heat recovery process, the flue gas 246 can be prepared for carbon recovery, including cooling, particulate removal (e.g., cyclones, filters, or electrostatic precipitators), and removal of acid gases or other contaminants to produce a treated flue gas suitable for $CO_2$ capture. The treated flue gas may then be sent to a $CO_2$ capture system, such as an amine-based absorption unit, physical solvent system, adsorption unit, membrane separation system, cryogenic separation system, or combinations thereof, to generate a $CO_2$-rich stream. The $CO_2$-rich stream can be compressed, dehydrated, and conditioned for transport to a sequestration site (e.g., geological storage, depleted hydrocarbon reservoirs, or saline formations) or for other long-term utilization. By capturing and sequestering at least a portion of the $CO_2$ generated in the regenerator while processing renewable feedstocks, the overall lifecycle carbon intensity of the resulting fuel products can be significantly reduced.

The hot FCC reactor product stream 240 exits the reactor section 506 and is directed to the fractionator 404 for fractionation. In the fractionator 404, the FCC reactor product stream 240 is separated into multiple cuts based on boiling range using distillation equipment, such as trays and/or packing, in combination with reflux and pumparound circuits (see 336 337 338 circuits). The hot FCC reactor product stream 240 is contacted within a lower portion 402 of the fractionator 404 by falling renewable material provided by renewable feedstock stream 206, as previously described. The renewable feedstock serves to cool the rising FCC reactor product vapors and captures and entrains catalyst fines carried in the FCC reactor products. The fractionator 404 may be operated such that the bottoms temperature is in the range of about 400° F. to about 800° F., about 500° F. to about 750° F., or about 520° F. to about 720° F., or any desired range as appropriate to collect the desired cuts.

In some embodiments, an overhead stream 290 comprising light gases, LPG-range hydrocarbons and/or light olefins (e.g., propylene and butenes), is withdrawn from an upper portion or the overhead section 406 of the fractionator 404 and may be optionally passed through a knockout drum 484 after cooling 482, and routed to downstream gas recovery or LPG handling facilities. Each of these may be a separate fraction cut, or may be combined. The purified overhead stream 298 may be compressed using one or more wet gas compressors 488 before being sent for further processing or to a high pressure receiver. Heavier components 292, primarily comprising components in the naphtha boiling range (e.g., light cat naphtha, heavy cat naphtha) may be recovered from the overhead stream. A portion of the recovered heavier species 192 may be recycled 294 (with flow controlled by pump 496 and valves) while another portion 296 (or all) of the recovered heavier species is pumped 486 and sent to a primary absorber.

Below the overhead section 406, components falling into the boiling range of 300° F. to about 800° F. may be recovered. For example, this may include components of the naphtha boiling range (e.g., light cat naphtha, heavy cat naphtha), the gasoline boiling range (e.g., light cat gasoline, heavy cat gasoline), kerosene boiling range, diesel boiling range, and cycle oil boiling ranges (e.g., light cycle oil, heavy cycle oil) may be recovered. One or more naphtha-range side draws 278 280 are taken, which may include a light catalytic naphtha fraction (e.g., having an approximate boiling range from about 80° F. to about 250-300° F.) and a heavy catalytic naphtha fraction (e.g., having an approximate boiling range from about 250-300° F. to about 430° F.). The naphtha draws 278 280 may be provided to a naphtha stripper unit 358. Steam 283 injected into the stripper 358 can promote separation of the naphtha components from the light cycle oil components 288, typically having a boiling range of about 430° F. to about 650° F., which fall into the light cycle oil stripper 460, where additional steam 285 may be provided to enhance component separation. These naphtha fractions can be processed further to produce renewable gasoline, petrochemical feedstocks, or reformer feed. Pumps 474 468 464 pressurize the naphtha fractions 284 286 and the light cycle oil (LCO) fraction 288 for downstream uses. The LCO fraction can be routed to hydrotreating or other finishing steps to produce renewable diesel and/or renewable jet/SAF blendstocks. A heavy cycle oil (HCO) fraction 264 may also be recovered from a lower or middle portion of the fractionator 402. A portion of the HCO fraction 265 may be separated and returned to the fractionator for further processing to ensure efficient separation.

Because the prepared renewable feedstock feed 230 to the FCC 503 includes renewable material, each of the overhead, naphtha, LCO, and heavier fractions recovered in the fractionator 404 contain and can be assigned a renewable carbon component, enabling the production of renewable LPG, renewable naphtha, renewable diesel/jet blendstocks, and, where present, renewable heavy cycle or slurry products. Operating conditions, draw locations, and cut points in the fractionator 404 can be adjusted to account for the lighter, more paraffinic product distribution associated with renewable feeds and to optimize the overall renewable product slate.

The products of the methods and systems as described herein may be suitable for use as a fuel or fuel additive or blending stock. The products may be fractioned to produce gasoline, jet fuel, diesel, or kerosene products. In some embodiments, the products are fractioned to product gasoline and/or jet fuel. The products may also be useful as feedstock for further refining/processing or other chemical reaction processes. The products may have a carbon intensity associated with them, often determined on a g $CO_2e$/MJ of fuel energy produced basis. Due to the renewable nature of the feedstocks, the products will have a much lower carbon intensity that petroleum-derived products of similar composition. For example, in some embodiments, the products have a carbon intensity of less than 50 g $CO_2e$/MJ, or less than 40 g $CO_2e$/MJ, or less than 30 g $CO_2e$/MJ, or less than 25 g $CO_2e$/MJ, or less than 20 g $CO_2e$/MJ. In some embodiments, the products advantageously have a carbon intensity of less than 15 g $CO_2e$/MJ. Due to the mass and energy integrations discussed above, the carbon intensity contribution of the FCC system is within 10% of the FCC process when processing a petroleum-derived fuel.

Prophetic and Practiced Examples

Carbon Intensity Calculations. Carbon intensity values were calculated for a petroleum-derived fuel and for three renewable fuels, specifically used cooking oil, tallow, and canola oil. The carbon intensity values are provided in g $CO_2e$/MJ of fuel energy produced. The renewable sourced fuels are estimated to provide a 70-80% or greater reduction in carbon intensity for the fuels provided.

TABLE 1

Carbon Intensity of FCC reactor products

| Feed Type | Petroleum-based Fuel | Used Cooking Oil | Tallow | Canola |
|---|---|---|---|---|
| Feedstock, Carbon Intensity | 93.0 | 6.1 | 6.7 | 19.3 |
| Pretreatment Process, Carbon Intensity Increment | — | 1.1 | 1.2 | 1.1 |
| Hydrodeoxygenation, Carbon Intensity Increment | — | 10.5 | 10.2 | 10.4 |
| Fluid Catalytic Cracking, Carbon Intensity Increment | 3.2 | 1.2 | 1.2 | 1.2 |
| Overall FCC Gasoline Product Carbon Intensity | 96.2 | 18.9 | 19.3 | 32 |

The renewable fuels have a much lower inherent carbon intensity due to their renewable nature. Hydrodeoxygenation and pretreatment of the fuels is required for the renewable feedstocks, which modestly increases the overall carbon intensity of the associated products. The heat integration methods and systems discussed herein, such as preheating the renewable feedstocks using the FCC reactor products in a fractionator and/or addition of petroleum-derived coke precursors keeps the FCC carbon intensity component flat across the renewable fuels and at a lower value than for the petroleum-derived fuel.

Fluid Cracking Pilot Plant Results. Pilot scale tests were performed for a hydrodeoxygenated renewable feedstock (hydrodeoxygenated vegetable oil, HVO) and raw vegetable oil. The fuels were injected primarily into the riser of the reactor section of the FCC and the FCC reactor product stream was fractioned using a fractionation column. Overall conversion of the fuel and product distributions were determined for single pass runs (no recycle) in an FCC unit, as described above. The renewable feed streams were preheated using the fractionation column, as described above, while the VGO was preheated primarily using a firing furnace. The conversion and composition results are provided in Table 2.

TABLE 2

Fluid Cracking Pilot Plant Results

| Feed Type | Units | *VGO | **HVO | Vegetable Oil |
|---|---|---|---|---|
| Conversion | Wt % | 83.30 | 91.45 | 67.96 |
| H2 | Wt % | 0.04 | 0.03 | 0.06 |
| CH4 | Wt % | 0.67 | 0.51 | 0.59 |
| C2 | Wt % | 0.47 | 0.40 | 0.69 |
| C2= | Wt % | 0.81 | 0.96 | 1.02 |
| C3 | Wt % | 1.38 | 3.39 | 0.45 |
| C3= | Wt % | 7.02 | 11.81 | 3.68 |
| IC4 | Wt % | 5.50 | 6.63 | 0.75 |
| NC4 | Wt % | 1.26 | 3.25 | 0.25 |
| C4= | Wt % | 0.95 | 1.00 | 0.97 |
| IC4= | Wt % | 1.11 | 1.74 | 1.45 |
| tC4= | Wt % | 2.34 | 3.32 | 1.33 |
| cC4= | Wt % | 1.78 | 2.54 | 0.98 |
| Gasoline | Wt % | 56.13 | 54.31 | 37.31 |
| LCO | Wt % | 13.46 | 7.66 | 25.06 |
| Bottoms | Wt % | 3.03 | 0.81 | 6.12 |
| Coke | Wt % | 4.05 | 1.66 | 7.15 |
| Water | Wt % | 0.00 | 0.00 | 12.12 |

*Vacuum Gasoil (Petroleum Based)
**Hydrodeoxygenated Vegetable Oil

Gasoline yields for VGO and HVO were similar, while the HVO also produced larger amounts of propane and propene. However, the HVO produced much less coke, such that supplemental heating of the catalyst was required to maintain suitable FCC operation temperature. Overall conversion of the HVO was very high, with very little material in the bottoms and reduced light cycle oil production compared to the VGO run.

The raw vegetable oil had much lower overall conversion, with large amounts of unconverted or partially converted material present in the bottoms and light cycle oil fractions. The raw vegetable oil produced significantly less gasoline and much higher amounts of light cycle oil fraction and bottoms material. This is likely due to the presence of longer chain and oxygenated hydrocarbon molecules in the raw oil. The raw vegetable oil also produced a significant amount of water due to high amount of oxygen present in the fuel. Coke make for the raw vegetable oil exceeded that of VGO, such that the system heat balance was less of an issue and no supplemental heating of the catalyst was required.

All of the products of these pilot tests could be assigned a carbon intensity value similar to Table 1. The products of the HVO and raw vegetable oil runs are renewable sourced fuels suitable for use as blend stock or direct use, with some optional additional treatment and/or polishing.

These pilot scale tests were performed to demonstrate the feasibility of the invention including preheating at a least a portion of a renewable feed stream.

While certain embodiments have been illustrated and described, it should be understood that changes and modifications can be made therein in accordance with ordinary skill in the art without departing from the technology in its broader aspects as defined in the claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As utilized herein with respect to numerical ranges, the terms "approximately," "about," "primarily," "substantially," "mostly," and similar terms will be understood by persons of ordinary skill in the art and will vary to some extent depending upon the context in which it is used. If there are uses of the terms that are not clear to persons of ordinary skill in the art, given the context in which it is used, the terms will be plus or minus 10% of the disclosed values. When "approximately," "about," "primarily," "substantially," "mostly," and similar terms are applied to a feature (e.g., to describe its shape, size, orientation, direction, composition, etc.), these terms are meant to cover minor variations in structure or composition that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims:

What is claimed is:

1. A method of producing a renewable fuel product, the method comprising:

optionally pretreating a renewable feedstock;

optionally hydroprocessing the renewable feedstock;

providing the renewable feedstock into one or more injection ports of a fractionator, thereby preheating the renewable feedstock with an FCC reactor product stream;

optionally further heating the preheated renewable feedstock;

feeding the preheated renewable feedstock into a reactor section of a fluidized catalytic cracker (FCC) such that at least a portion of the preheated renewable feedstock is contacted with an FCC catalyst, thereby producing the FCC reactor product stream;

feeding at least a portion of the FCC reactor product stream to at least one of the fractionator or a second fractionator; and fractionating at least a portion of the FCC reactor product stream into two or more fraction products comprising light gases, liquified petroleum gas, light cat naphtha, heavy cat naphtha, light cat gasoline, heavy cat gasoline, kerosene, diesel, cycle oil, and slurry;

wherein the renewable feedstock comprises one or more of a plant-derived oil, a plant-derived fat, an animal-derived oil, an animal-derived fat, free fatty acids, and algal oils, wherein preheating the renewable feedstock is performed via direct contact of at least a portion of the renewable feedstock with at least a portion of the FCC reactor product stream in the fractionator.

2. The method of claim 1, wherein the fractionator has a fractionator bottoms temperature between 520° F. and 720° F.

3. The method of claim 1, wherein a portion of one or more of the two or more fraction products recovered from the fractionator are returned to the reactor section for further conversion.

4. The method of claim 1, wherein the preheated renewable feedstock comprises catalyst fines captured from the fractionator, the catalyst fines comprising FCC catalyst captured.

5. The method of claim 1, further comprising heating at least a portion of the renewable feedstock in a fired heater.

6. The method of claim 1, wherein the reactor section of the fluidized catalytic cracker comprises a riser and a reactor.

7. The method of claim 1, wherein a liquid portion of the renewable feedstock has a boiling point of about 250° F. to about 1150° F.

8. The method of claim 1, wherein the renewable feedstock further comprises a petroleum-derived coke precursor material.

9. The method of claim 1, further comprising injecting a petroleum-derived coke precursor material into the reactor section of the FCC.

10. The method of claim 9, wherein the petroleum-derived coke precursor material comprises slurry oil, coker gas oil, petroleum residue, or a combination thereof.

11. The method of claim 1, further comprising:

separating at least a portion of the FCC catalyst from the FCC reactor product stream;

providing the separated FCC catalyst to a regenerator wherein the FCC catalyst is contacted with oxygen; and regenerating the FCC catalyst in the regenerator.

12. The method of claim 11, wherein at least a portion of a hot waste gas produced by the regeneration of the FCC catalyst is used to: provide energy to a turboexpander to produce electric or shaft power to drive a blower for a regenerator air feed, preheat the regenerator air feed, or any combination thereof.

13. The method of claim 12, wherein at least a portion of a regenerator flue gas is prepared for carbon capture and sequestration.

* * * * *